June 2, 1925. 1,540,729
F. E. YORK
ROAD SCARIFYING AND STONE REMOVING VEHICLE
Filed Feb. 11, 1922   3 Sheets-Sheet 1

Inventor
F. E. York
By Howard P. Denison
Attorney

Figures 3, 4:
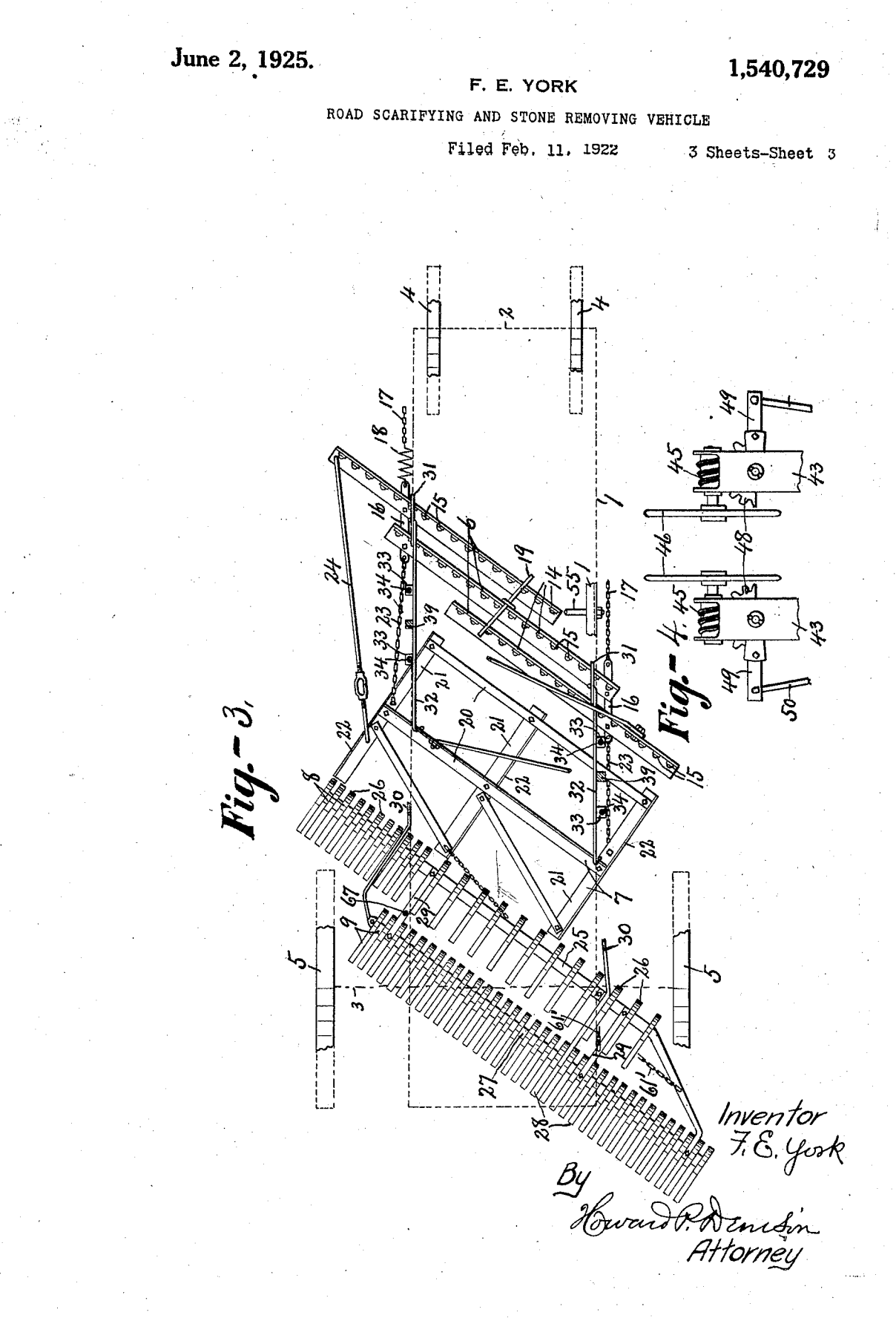

June 2, 1925.

F. E. YORK 1,540,729

ROAD SCARIFYING AND STONE REMOVING VEHICLE

Filed Feb. 11, 1922 3 Sheets-Sheet 3

Inventor
F. E. York
By
Howard P. Denison
Attorney

Patented June 2, 1925.

1,540,729

UNITED STATES PATENT OFFICE.

FRITZ E. YORK, OF EARLVILLE, NEW YORK.

ROAD-SCARIFYING AND STONE-REMOVING VEHICLE.

Application filed February 11, 1922. Serial No. 535,937.

*To all whom it may concern:*

Be it known that I, FRITZ E. YORK, of Earlville, in the county of Madison, in the State of New York, have invented new and useful Improvements in a Road-Scarifying and Stone-Removing Vehicle, of which the following, taken in connection with the accompanying drawings, is a full, clear, and exact description.

This invention relates to a road scarifying and stone removing vehicle involving the use of a main frame mounted upon suitable supporting wheels and carrying a system of scarifiers, scrapers and stone collectors mounted in sequence thereon from front to rear of the machine in such relation as to successively loosen the surface stones, grade the loose soil and collect the loose stones and deflect them to one side of the road-way as the machine is propelled along said road-way.

The main object is to effect these three results in sequence by the same machine.

Another object is to flexibly connect the scarifying, scraping and stone collecting units in such manner that they will be maintained in definite diagonal relation with each other and with the line of draft and at the same time enable each unit to adjust itself vertically independently of the other units to conform to slight variations in the surface contour of the road.

A further object is to provide means for effecting these vertical adjustments of the several units and different parts of the same unit to vary its pressure and relation to the road surface.

Other objects and uses relating to specific parts of the machine will be brought out in the following description:

In the drawings:

Figure 3 is a top plan of the connected units detached from the frame showing portions of the front and rear wheels to indicate the direction of draft or movement when the machine is in operation.

Figure 4 is a transverse vertical sectional view taken on line 4—4 Figure 1 showing more particularly the worm and gear drive of the lifting mechanism for the scarifier and scraper.

The main frame —1—, including the front axle —2— and rear axle —3—, is mounted upon suitable front and rear supporting wheels —4— and —5— to form a carrier for a scarifier —6—, a scraper —7— and stone collecting and deflecting rakes —8— and —9—.

The machine may be propelled by animal or other motive power through the medium of the tongue —10— connected in any well known manner to the front axle —2— for steering purposes, said machine being provided with a spring seat —11— on the front end of the frame and a tool box —12— on the rear end, the portion of the frame just in front of the rear axle being provided with a platform —13— upon which an operative may stand for convenience of manipulation of certain parts of the machine hereinafter described.

The scarifier —6—, surface scraper frame —7— and rakes —8— and —9— are arranged in sequence from front to rear diagonally to the center line of draft and substantially equal distances to opposite sides of said center line to distribute the load more evenly across the surface traversed by the machine when either or all of the units are in action.

The angle of obliquity to the center line of draft of each unit is substantially equal and somewhat greater than 45 degrees or more approximately 60 degrees and therefor those units are substantially parallel. The scarifier —6— is adapted to loosen the surface soil and stones therein and comprises a plurality of, in this instance three, angle bars —14— of substantially equal length arranged in diagonally parallel spaced relation lengthwise of the machine but staggered transversely so as to extend one beyond the other from side to side of the machine, each bar being provided with a lengthwise row of downwardly extending teeth —15— adapted to engage the surface of the road, the teeth of the several bars being arranged in staggered relation lengthwise of the machine so as to travel in approximately parallel paths close to each other to assure the loosening of any stones which may lodge in the surface soil, while the diagonal relation of the several bars relatively to the line of draft tends to deflect the stones toward the side of the road corresponding to the ends of the bars nearest the rear of the machine.

The outer ends of the intermediate bar

Figure 1:
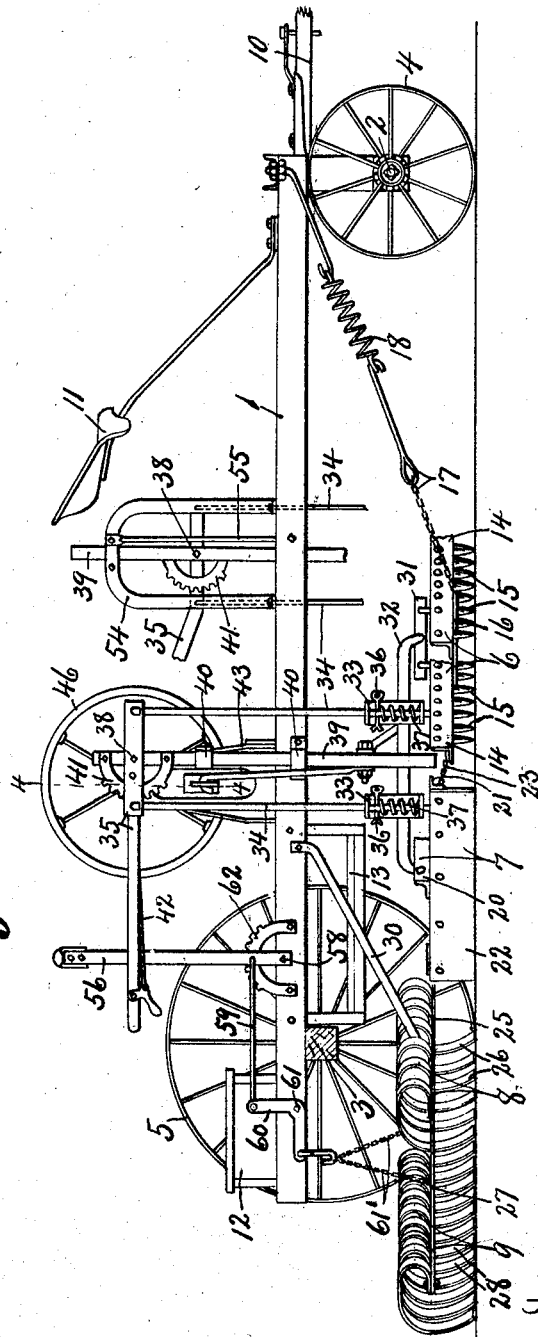
Figures 1 and 2 are elevations of opposite sides of the machine with certain portions broken away to avoid duplication.
Figure 2:
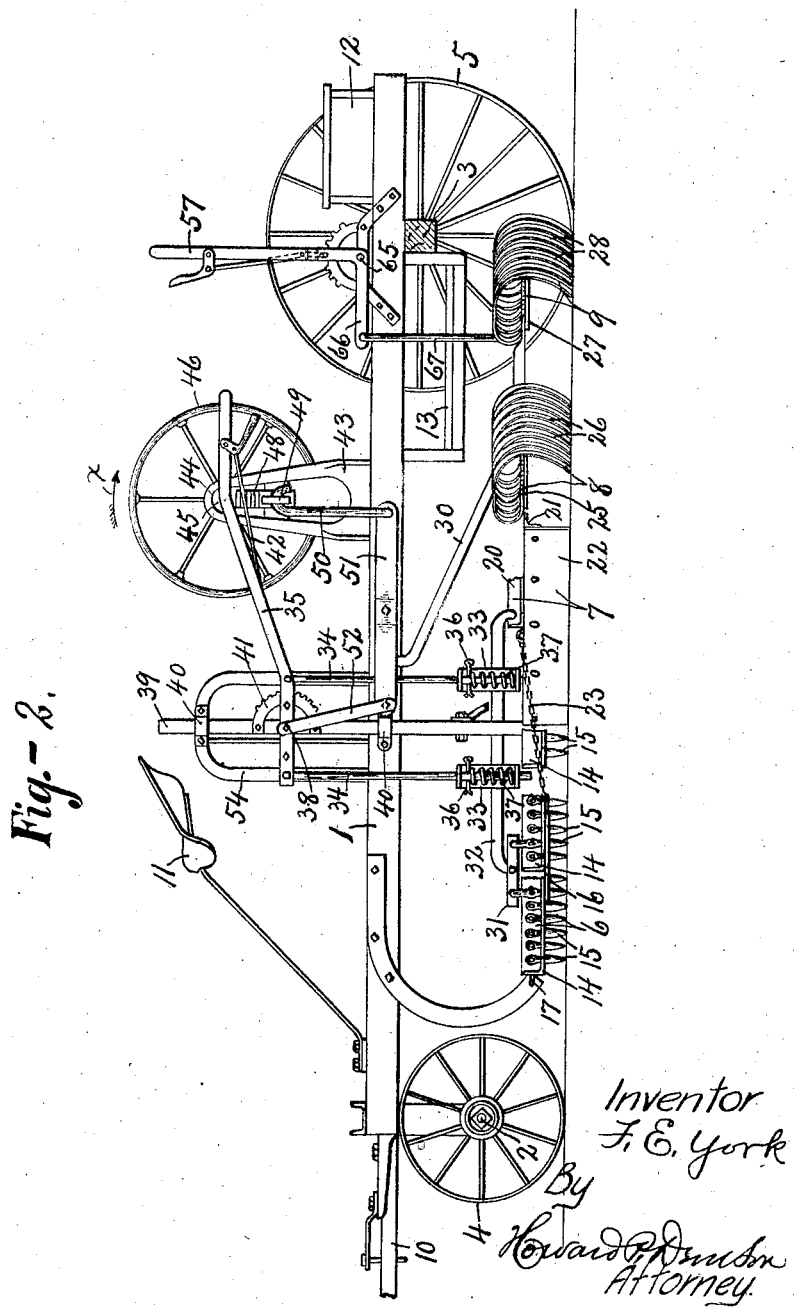

—14— are connected to the intermediate parts of the front and rear bars by draft bars —16— having their front ends connected by flexible cables —17— to the front end of the frame —1— of the machine as shown in Figures 1 and 2, each flexible cable including therein a coil spring —18— to avoid excessive strains upon the scarifier and its connections with the frame in case the teeth should encounter excessive resistance in dragging over the road surface although the springs are sufficiently heavy to draw the scarifier and parts connected thereto under ordinary conditions.

An intermediate tie bar —19— connects the three bars —14— to additionally hold them in more or less fixed parallel relation both vertically and horizontally.

The scraper frame —7— comprises a plurality of, in this instance two, frame bars —20— extending diagonally of the line of draft parallel with the bars —14— in transversely spaced relation, and a series of, in this instance three, cross bars —21— rigidly secured to the bars —20— at substantially right angles thereto for receiving and supporting a corresponding number of scraper blades —22— which are rigidly secured by any suitable fastening means to the cross bars —21— and extend downwardly therefrom for engaging the road surface.

These cross bars —21— and their scraper blades —22— are disposed in transversely spaced relation and at substantially right angles to the scarifier bars —14— and are, therefore, diagonal to the line of draft but at a reverse angle to that of the scarifier bars, the entire scraper frame unit being located at the rear of the scarifier and preferably directly opposite the rear bar —14— so that its scraper blades which are all of substantially the same length and parallel with each other tend to grade and smooth the loose soil on the road surface and to gradually distribute said loose soil in a direction opposite that to which the stones are deflected by the scarifier —6—.

The opposite ends of the scraper frame —7— are connected by flexible cables —23— to the rear ends of the draft bars —16— Figure 3, said cables being substantially parallel with the line of draft.

If necessary, a brace rod —24— may be employed to connect the outer end of the front bar —14— with the corresponding end of the scraper frame —7— to prevent excessive lateral movement of said scraper frame in the opposite direction due to the resistance of the surface soil on the blades when the machine is in action.

The stone collector —8— is located directly at the rear of the scraper frame —7— parallel with the scarifier bars —14— and therefor diagonally of the line of draft and comprises a frame bar —25— carrying a lengthwise row of spring teeth —26— rigidly secured thereto with their points in substantially the same horizontal planes and adapted to engage the surface of the road, those at the forward and beyond the adjacent end of the rear stone collector —9— and covering a distance equal to approximately half the length of the scraper frame —7— being relatively close together but in slightly spaced relation, while the remaining series of teeth are spaced relatively farther apart so that the end series which are closer together serve to collect the finer as well as the coarser stones and to deflect them laterally toward the teeth which are farther apart, thereby allowing the finer stones to pass between the coarser teeth while the heavier stones are collected by said coarser teeth and gradually carrying the coarser stones toward the rear end of the collector or, in this instance, to the right hand of the machine Figure 3, thereby relieving the collector —8— from excessive load.

The rear collector —9— is located at the rear of and parallel with the collector —8— and comprises a frame bar —27— and a lengthwise row of spring teeth —28— of substantially the same length as but in staggered relation to the collector —8—, the teeth —28— being arranged relatively close to each other but slightly separated with their points disposed in the same horizontal plane and adapted to engage the road surface for collecting the fine as well as any coarse stones which may pass through the collector —8— and deflecting them toward the rear end of the collector —9— or to the right hand side of the machine as the latter is drawn along the road-ways.

The frames of the collecting units —8— and —9— are connected to each other and to the main frame —1— by draft bars —30—, the connection between said bars and the main frame being pivotal to enable the collecting units to rock vertically relatively thereto.

The rear end of the frame bar —25— is also connected to the corresponding end of the frame bar —27—, said frame bars being also connected to each other by bars —29— to rigidly connect the two frames together to form a unitary collector which together with the scraper and scarifier are movable vertically relatively to each other and to the main supporting frame —1— to permit each unit to be elevated above the surface of the ground or depressed into engagement therewith under varying pressures if required.

For this latter purpose, the intermediate scarifier bar —14— is connected near its opposite ends to the front and rear bars —14—, respectively, by yoke bars —31— which in turn are connected by parallel lengthwise bars —32— to opposite ends of the rear bar —20— of the scraper frame —7— Figure 3, the connections between the bars —32— and yokes —31— and also between said bars and the frame —7— being pivotal to allow the scarifier and scraper frame to be moved vertically relatively to each other.

Each bar —32— is provided with a pair of guide brackets —33— pivotally connected thereto in longitudinally spaced relation and provided with lower and upper apertured lugs for receiving vertically movable lifting rods —34— which are slidable in the apertured lugs and are pivotally connected at their upper ends to a hand lever —35—.

The rods —34— of each pair are provided with relatively fixed shoulders —36— in lifting engagement with the under sides of the upper apertured lugs of the bracket —33— whereby the elevation of the rod —34— will cause a similar elevation of the scarifier and scraper frames.

The portions of the rod —34— between the shoulders —36— and lower apertured lugs of the brackets —33— are surrounded by coil springs —37— which rest upon the lower lugs and afford a resilient connection between the bars —32— and rods —34— to allow the scarifier and scraper to move vertically relatively to each other or together in passing over obstructions without overstraining the rods —34— and their supports and at the same time permitting those units to be held against the road surface under yielding pressure.

Each of the hand levers —35— is pivoted at —38— to a guide rod —39— which is located substantially midway between the lifting rods —34— and is movable vertically in guides —40— on the main frame —1— and is provided with a toothed segment —41— rigid thereon concentric with the axis of the pivot —38— and adapted to be engaged by a suitable pawl —42— on said lever, whereby corresponding ends of the scarifier and scraper may be moved up or down in reverse directions and locked in their adjusted positions.

Mounted upon the main frame —1— is a pair of upright brackets —43— in transversely spaced relation directly opposite each other or at right angles to the line of draft of the machine and are provided at their upper ends with bearings —44— for receiving and supporting a pair of worm shafts —45— having hand wheels —46— by which they may be rotated in reverse directions.

Suitable worm gear segments —48— are also journaled upon the brackets —43— to mesh with their respective worms —45— and are provided with outwardly projecting apertured crank arms —49—, one of which as that at the left hand side of the machine is connected by a link —50— to one end of a horizontally extending lever —51— on the main frame —1— Figure 2, the other end of said lever being connected by a link —52— to the lever —35— preferably at its point of connection with the guide bar —39— whereby the rotation of the hand wheel —46— rearwardly in the direction indicated by arrow —X— will elevate the guide rod —39— and lever —35— carried thereby to cause a corresponding elevation of the scarifier and scraper frame whereas the rotation of the hand wheel —46— in a reverse direction will cause a lowering of those units and if it is desired to raise or lower one of said units relatively to the other irrespective of the hand wheel —46—, it may be done by adjusting the lever —35— upwardly or downwardly along the rack —41—, thus permitting the adjacent end of either of the units to be pressed against the road surface with greater pressure than the other unit or by proper adjustment of the wheel —46—, the corresponding end of both units may be raised or lowered together independently of the other end of the same units.

The guide rod —39— at the right hand side of the machine is in close proximity to and just at the outside of the adjacent bracket —43— which latter is provided with a guide member —40— for additionally guiding the rod —39— in its vertical movement. The other guide rod —39— at the opposite or left hand side of the machine is located a considerable distance in front of the adjacent bracket —43— and in order that it may be properly guided in its vertical movement, I have provided an extra bracket —54— rising from the adjacent side of the main frame and provided with a guide —40— for receiving the upper end of the rod —39—, the upper end of said bracket —54— being braced to the opposite side of the main frame by a brace rod —55—.

It is now evident that corresponding ends of the scarifier and scraper frames may be adjusted vertically relatively to each other by the corresponding hand lever —35— and that they may also be adjusted vertically in the same direction by means of a corresponding hand wheel —46—, said adjustments being independently of each other as will be apparent from the foregoing description.

Suitable means is also provided for raising and lowering both ends of the stone collecting rakes —8— and —9— independently of each other and for this purpose are provided two hand levers —56— and —57—, one at each side of the machine near the rear end thereof, the lever —56— being pivoted at —58— to the adjacent or right hand side of the frame —1— and connected by a link —59— to one arm of a bell crank lever —60— which in turn is pivoted at —61— to the adjacent side of the frame —1— and has its other arm connected by a chain —61¹— to the cross bars —29— whereby the rocking of the lever —56— forwardly and rearwardly will cause corresponding raising or lowering of both of the stone collectors —8— and —9—.

A toothed segment —62— is secured to the frame —1— concentric with the pivot —58— of the lever —56— to be engaged by a suitable dog, not shown, on said lever for holding the stone collectors in their vertically adjusted positions.

The lever —57— is pivoted at —65— to the left hand side of the frame —1— and is provided with a longitudinally extending arm —66— connected by a link —67— to the connecting bar —29— for the collector frames, whereby the rearward and forward movement of said lever will cause a corresponding elevation or depression of the adjacent end of the stone collectors.

From the foregoing description, it will be seen that either end of the scarifier —6— or scraper —7— may be raised and lowered independently of the other and by the manipulation of the corresponding hand wheel —46— and that the same ends of those parts may be adjusted vertically relatively to each other independently of the hand wheels through the medium of their corresponding levers —35—.

It is also evident that either end of the stone collecting rakes —8— or —9— may be raised or lowered independently of the other and by the proper adjustment of the corresponding lever —56— or —57— and held in its adjusted position by the engagement of its pawl with the adjacent toothed rack —62—.

What I claim is:

1. In a road machine of the character described, the combination of a main frame and supporting wheels therefor, of a scarifying unit, a scraping unit and a stone collecting rake unit all arranged in sequence from front to rear beneath said frame, connections between the scarifying unit and frame, connections between the scraper and scarifier, and connections between the frame and stone collecting unit.

2. In a road machine of the character described, the combination of a main frame and supporting wheels therefor, of a scarifying unit, a scraping unit and a stone collecting rake unit all arranged in sequence from front to rear beneath said frame, connections between the scarifying unit and frame, connections between the scraper and scarifier, and connections between the frame and stone collecting unit, all of the units being disposed diagonally to the line of draft of the machine.

3. In a road machine of the character described, the combination of a main frame and supporting wheels therefor, of a scarifying unit, a scraping unit and a stone collecting rake unit all arranged in sequence from front to rear beneath said frame, connections between the scarifying unit and frame, connections between the scraper and scarifier, connections between the frame and stone collecting unit, and means on the frame for raising and lowering one of said units.

4. In a road machine of the character described, the combination of a main frame and supporting wheels therefor, of a scarifying unit, a scraping unit and a stone collecting rake unit all arranged in sequence from front to rear beneath said frame, connections between the scarifying unit and frame, connections between the scraper and scarifier, and connections between the frame and stone collecting unit, and means on the frame for simultaneously adjusting the scarifying and scraping units vertically in the same direction.

5. In a road machine of the character described, the combination of a main frame and supporting wheels therefor, of a scarifying unit, a scraping unit and a stone collecting rake unit all arranged in sequence from front to rear beneath said frame, connections between the scarifying unit and frame, connections between the scraper and scarifier and connections between the frame and stone collecting unit, and means for simultaneously adjusting one of the units vertically in one direction and another unit vertically in the opposite direction.

6. In a road machine of the character described, the combination of a main frame and supporting wheels therefor, of a scarifying unit, a scraping unit and a stone collecting rake unit all arranged in sequence from front to rear beneath said frame, connections between the scarifying unit and frame, connections between the scraper and scarifier and connections between the frame and stone collecting unit, and means on the frame for adjusting the stone collecting unit vertically independently of the other units.

7. In a road machine of the character described, the combination of a main frame and supporting wheels therefor, of a scarifying unit, a scraping unit and a stone collecting rake unit all arranged in sequence from front to rear beneath said frame, connections between the scarifying unit and frame, connections between the scraper and scarifier and connections between the frame and stone collecting unit, and separate devices for adjusting opposite ends of the stone collecting unit vertically independently of each other.

8. In a road machine of the character described, the combination of a main frame, and supporting wheels therefor, a scarifying unit, a scraping unit and a stone collecting unit all arranged in sequence from front to rear beneath the frame and extending diagonally across the central line of draft of the machine, and connections between each unit and the frame.

9. In a road machine of the character described, the combination of a main frame, and supporting wheels therefor, a scarifying unit, a scraping unit and a stone collecting unit all arranged in sequence from front to rear beneath the frame and extending diagonally across the central line of draft of the machine and connections between each unit and the frame, said stone collecting unit comprising a relatively fine toothed rake and a coarse toothed rake arranged in parallelism one in advance of the other.

10. In a road machine of the character described, the combination of a main frame, and supporting wheels therefor, a scarifying unit, a scraping unit and a stone collecting unit all arranged in sequence from front to rear beneath the frame and extending diagonally across the central line of draft of the machine, and connections between each unit and the frame, said scarifying unit comprising a plurality of parallel bars arranged in sequence one in advance of the other and each provided with a row of teeth.

11. In a road machine, the combination with a frame and supporting wheels therefor, of a scarifier unit having a row of teeth extending transversely of and beneath the frame and diagonally to the line of draft, a scraper unit at the rear of the scarifier unit having blades extending at substantially right angles to said scarifier unit, and a stone collecting unit at the rear of the scraper and provided with a row of teeth parallel with those of the scarifier, said units being operatively connected to the frame.

12. In a road machine of the character described, the combination with a main frame and supporting wheels therefor, a scarifying unit flexibly connected to the main frame, a scraping unit flexibly connected to the scarifying unit at the rear thereof, a stone collecting unit located at the rear of the scraping unit and operatively connected to said frame, all of said units extending transversely of and beneath the main frame diagonally to the line of draft, separate devices for raising and lowering opposite ends of the scarifying and scraping units independently of each other, and separate devices for raising and lowering opposite ends of the stone collecting unit independently of each other.

In witness whereof I have hereunto set my hand this 7th day of February, 1922.

FRITZ E. YORK.

Witnesses:
H. E. CHASE,
M. C. RILL.